ly designed connectors and a pin with a shape designed to accommodate for manufacturing tolerances in the internal dimensions of the tubular portion of the sections.

United States Patent [19]
Rousseau

[11] 3,898,728
[45] Aug. 12, 1975

[54] JOINING OF TUBULAR SECTIONS
[75] Inventor: Paul E. Rousseau, Brussels, Belgium
[73] Assignee: Sadacem Societe Anonyme, Brussels, Belgium
[22] Filed: May 21, 1973
[21] Appl. No.: 362,459

Related U.S. Application Data
[63] Continuation-in-part of Ser. No. 260,259, June 6, 1972.

[52] U.S. Cl. .................. 29/446; 29/525; 29/526; 52/656; 52/758 H; 403/297; 403/401
[51] Int. Cl. ............................................ B23p 11/02
[58] Field of Search .......... 403/295, 297, 290, 401; 52/758 H, 656; 29/522, 526, 446

[56] References Cited
UNITED STATES PATENTS
| | | | |
|---|---|---|---|
| 2,451,076 | 10/1948 | Edwards | 403/295 |
| 2,776,735 | 1/1957 | Bancroft | 29/522 X |
| 3,822,101 | 7/1974 | Schneider | 403/295 |

FOREIGN PATENTS OR APPLICATIONS
| | | | |
|---|---|---|---|
| 468,771 | 10/1950 | Canada | 403/401 |
| 932,765 | 12/1947 | France | 403/401 |
| 1,286,367 | 1/1962 | France | 403/401 |
| 1,500,683 | 9/1969 | Germany | 403/401 |
| 1,521,980 | 0000 | France | 403/401 |

*Primary Examiner*—Werner H. Schroeder
*Assistant Examiner*—Wayne L. Shedd
*Attorney, Agent, or Firm*—Robert E. Strauss

[57] ABSTRACT

A method is described for joining of mating ends of tubular metal sections in the manufacture of window and door frames and the like. The invention employs internal connectors which are wedged outwardly into tight engagement with the internal walls of the sections by pins that are driven through the wall of each section and into slits which are preformed in the arms of the connectors. The pins punch a pellet of metal from the wall and drive it through the slit and into a cold weld with the opposite wall. Very tight and precise joints are attained by the method which comprises compression of the sections together on the joint line and placement of the pins through the sections. Both sections of an in-line joint can be secured in one operation. With mitered, angle joints, one arm of the connector is placed within the first of the two sections slightly past its intended joint line and is locked therein by driving at least one pin through a wall of the section and the slit in the connector arm. The second section is then placed on the remaining arm of the connector and sufficient pressure is applied axially to the sections to compress them together and to draw the arm of the connector into precise alignment in the joint. One or more pins are then driven through the wall of the second section and the slit of the remaining arm to lock the sections together. Also disclosed are joints of relatively large tubular sections with specially designed connectors and a pin with a shape designed to accommodate for manufacturing tolerances in the internal dimensions of the tubular portion of the sections.

The method is superior to welding and to other mechanical join of sections. Welding anneals and weakens the metal and requires refinishing to remove marks and weldment. Other mechanical joints are weak, do not seal to the environment, and can break the anodic coating or finish of the metal.

4 Claims, 13 Drawing Figures

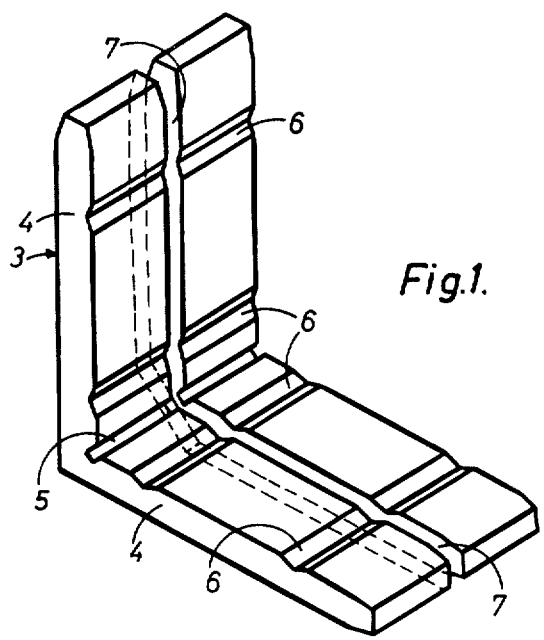
Fig.1.
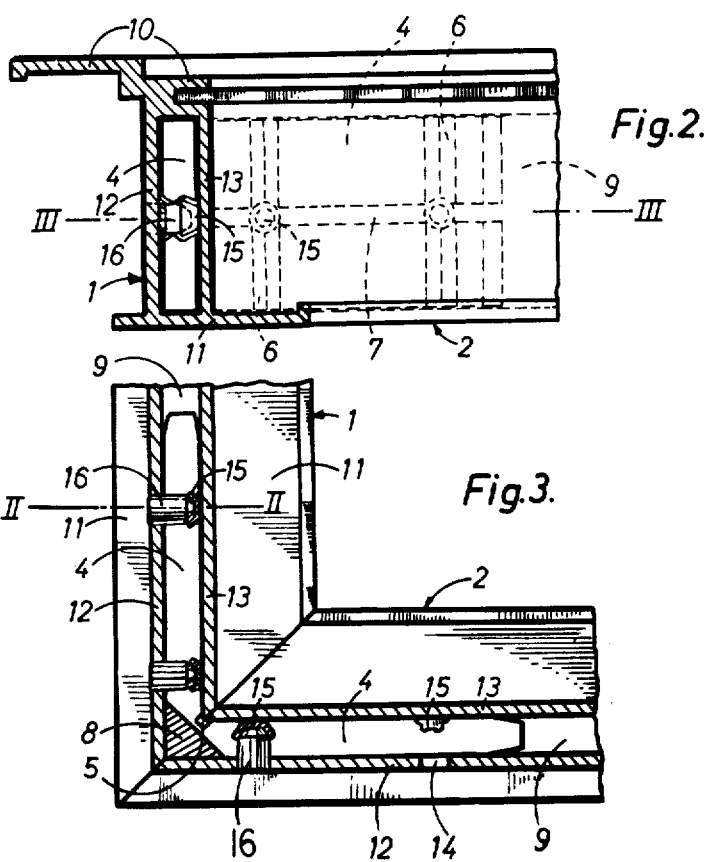
Fig.2.
Fig.3.

PATENTED AUG 12 1975

3,898,728

SHEET 3

JOINING OF TUBULAR SECTIONS

DESCRIPTION OF THE INVENTION

This application is a continuation-in-part of my copending application, Ser. No. 260,259, filed June 6, 1972.

BACKGROUND OF THE INVENTION

There is described in my prior patents, such as Belgium Pat. Nos. 781,078 of July 18, 1972 and Patent 690,549 of May 5, 1967, a method of joining sections of extruded tubular structural sections, which are preferably formed of aluminum, in which a connector having split arms is inserted into the mating ends of the sections and the halves of the split arms are expanded laterally against opposite walls of the tubular portions of the section. A cylindrical pin of hard metal, e.g., stainless steel, is introduced into the slits in the split arms of the connector to expand the latter against the inside walls of the section, thereby fastening the connector to the sections. The pin is pressed through a wall of the section and removes from the wall, by punching, a pellet of malleable metal which the pin pushes through the slit and crushes against the opposite wall when it has itself penetrated into the slit. The method is suitable for joining two sections having a rectangular cross section to produce a joint having a strength within the elastic limit of the material with a hairline juncture between the sections which is sealed against the weather. The method is particularly useful for joining of prefinished sections such as those of anodized aluminum since no finishing need be performed on the assembled joint.

It is disclosed in my copending application that some distortion of the joined sections has occurred because of the manufacturing tolerance in the internal dimensions of the tubular portions of the sections. If the internal width of the tubular portion is too great for the internal expansion of the connector, a firm joint can not be attained. If the internal width is too slight, or if the insertion of a pin into the slit of the connector causes excessive lateral expansion, the walls of the section will be distorted, undergoing an arching. The assembled vent portion of the frames are then difficult to situate in the outer frame provided for the window or door. In addition there is a risk that the arching will crack the surface, destroying the integrity of the surface protective film or anodic coating. In my prior application, I disclose a solution to these difficulties which comprises the use of pins which have hollows in their cylindrical faces which are intended to receive metal by cold flow from the connector when the distance between two opposite walls of the tubular portion tends towards or is below the minimum design dimension. Because the pin thus accommodates for substantial differences between the internal widths of the sections and the expanded width of the connector, maximum diameter of the pin can be selected sufficiently great that a connection will be attained between the sections and the connector even when the internal width of the tubular portion is at the maximum tolerance for extruded aluminum shapes. The particularly preferred form and shape of these pins will be described in greater detail hereinafter.

The methods and means described in my prior patents and copending application have been described with reference to sections having relatively thin tubular elements and it is desirable to provide methods and means useful to join sections of greater tubular dimensions.

It is desirable to provide a method whereby sections can be joined in precise and tight joints and to provide means for making such joints.

BRIEF DESCRIPTION OF THE INVENTION

This invention comprises a method whereby the mating ends of tubular sections are joined in a precise and tight joint with an internal connector having slit arms which are expanded into compression against the internal walls of the tubular sections by pins which are driven through a side wall of the sections and through the slit of each arm of the connector. The method of fabrication of the joint comprises inserting one arm of the connector into a first section with the intended joint line of the connector extending slightly into the first section, securing the connector thereto by driving at least one pin through a sidewall of the section, positioning the other section over the remaining or free arm of the connector, applying a pressure, axially, to the sections to compress them and draw them into precise alignment along the juncture plane of the sections and placing the secured arm of the connector under stress and drawing the connector into alignment with its intended joint line on the juncture plane of the sections. At least one pin is then driven through a sidewall of the second section to secure the sections in a compressed alignment on the connector. In preferred embodiments, there are provided various means to secure the desired positioning of the connector and sections.

The invention is also applicable to the joining of sections having relatively large tubular elements by the use of a plurality of connectors which are placed in a stacked array and which have areas of reduced thicknesses to maintain appropriate thickness of slit metal through which the pins are driven.

Finally, the invention also includes the subject matter of the aforementioned, prior, copending application which comprises a joint which is secured with having hollows to compensate for variable manufacturing tolerances, as well as the pins themselves.

BRIEF DESCRIPTION OF THE FIGURES

The invention is illustrated by the FIGURES, of which:

FIG. 1 illustrates a typical connector;

FIG. 2 shows a corner off a frame joined by such a connector;

FIG. 3 is a view along the line III—III of FIG. 2;

FIGS. 11 and 12 illustrate in-line joints and an in-line press.

DESCRIPTION OF PREFERRED EMBODIMENTS

Figure 4:
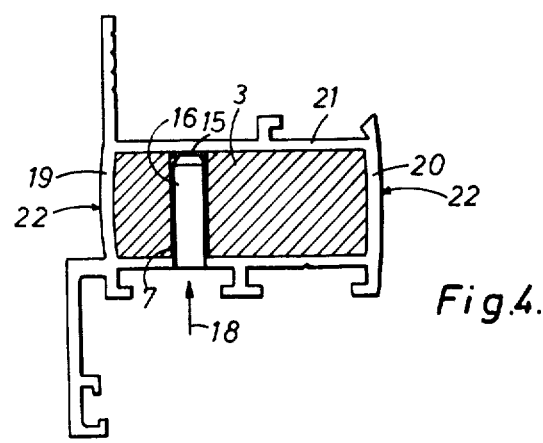
FIG. 4 is a view of the tubular portion of a badly distorted, joined section.

The connector typically used is shown as an angle 3 in FIG. 1, as intended for use with a mitered corner. It is of course apparent that the connector could be entirely straight for a butt joint or could be of any angle desired for the joint. As illustrated, the connector for the mitered connection of sections 1 and 2 (FIGS. 2 and 3) comprises an angle 3 which can be produced by cutting up an extruded angle bar having arms 4, which are, preferably, slightly bevelled at their ends and, at their intersection along the inside base of the angle, have a groove 5. Preferably, arms 4 are of the same length. On the side the extruded angle bar may also have shallow longitudinal grooves 6. At a median plane, intermediate the width of each cut-off, i.e., angle 3, the arms have a notch which produces a slit 7 that extends inwardly to the intersection of the arms so that the split arms are still connected together by a metal bridge or web 8 (FIG. 3), and consequently the angle 3 remains in one piece.

Mitered sections 1 and 2 may have any suitable cross section, for example, a Z-shaped section as shown in FIGS. 2 and 3, however, they should have a tubular portion having a polygonal, preferably rectangular, cross section which corresponds to that of the arms 4 of the angle 3. As is best shown by FIG. 2, the arms 10 of one side of the sections are connected to the arms 11 of the other side of the sections by intermediate walls 12 and 13, and the tubular portion 9 is then constituted by these intermediate walls and by a portion of the arms 10 and 11 or a portion adjoining these arms.

FIGS. 2 and 3 illustrate a joined connection between the mitered sections 1 and 2. Angle 3 has been inserted into the mating ends of the sections and two pins have been driven through each of walls 12 of these sections. The pins, as they penetrate the wall, break out a circular aperture for the pin and form a pellet 15 which is driven through slit 7 and against the opposite inside surface of wall 13. This causes the split halves of arm 4 to expand laterally and binds their edges against the opposed, inside surfaces 10a and 11a. The compression causes pellet 15 to cold flow about the inside end of the pin and form a cold weld that secures the pin.

As will be described in greater detail hereinafter, the joint is formed by inserting one arm of the connector into one of the sections, e.g., into section 2 with forward edge of section 2 projecting into groove 5, thereby positioning the connector slightly past its intended position in the final joint. After the connector is secured to section 2 by the pins 15, section 1 is placed over the free arm of the connector and pressure is applied axially to the section to force sections 1 and 2 together sufficiently to draw the connector into its symetrical position shown and then pins 15 are driven through sidewall 12 in a manner similar to that used for section 2.

Each section shape and size will have a characteristic connector designed for the proper expansion with the particular section. Frequently, it is not possible to maintain the internal dimensions of the tubular element of the section within a sufficiently close tolerance that a smooth-shanked pin such as shown in FIGS. 2 and 3 will be satisfactory. As previously mentioned, the pins are driven through a sidewall of the tubular section, forming an aperture 14 in the wall and yielding a pellet 15 of malleable metal. The head of the pin pushes the pellet through slit 7 amd crushes it against the inside of wall 13, preferably in groove 6 where the pellet can overflow and become anchored when the pin has penetrated and reached its permanent position.

As shown in FIG. 4, a pin 16 having a smooth-shank portion can not accommodate any excess any amount of metal. Thus, when the inside dimensions of the tubular element of the section are less than design and less than the planned manufacturing tolerance, the pin 16 applies an outward pressure to the walls 19 and 20 of the badly extruded section 21 and deforms these walls into a convex curvature as indicated by lines 22.

Figure 5:
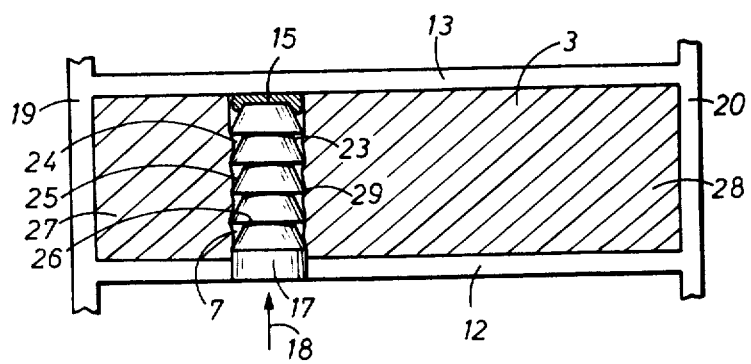
FIG. 5 is a view of a section joined by an improved pin of the invention.

The curvature or arching apparent in FIG. 4 does not occur when a pin such as that shown in FIG. 5 is used for securing the connector in a poorly extruted section. As shown, the pin 17 has hollows 24 which are, preferably in the form of circular notches 23. If desired, other forms could be used, e.g., a plurality of longitudinal grooves could be provided in the pin surface. The preferred form is shown with a plurality of beveled grooves tapered inwardly in the direction of travel of the pin and forming a plurality of conical skirts 25, the diameter 26 which is the same as that of the conventional cylindrical pin 16.

When the pin penetrates into the slit 7 in the direction of the arrow 18, it pushes, in front of it, the pellet 15 of malleable metal and spreads the two portions 27 and 28 of the angle 3. Because of the malleable nature of the extruded sections, the metal pellet cut therefrom by the pin 17 flows around the edges 29 of the pin and partly into the hollows 24. The metal behaves elastically and partly resumes its original shape. The degree to which the flow into the hollows 24 occurs depends upon the internal pressures generated by entry of the pin. If the sections are precisely extruded to the design dimensions, the compressive forces about the pin will be such that only a slight amount of metal flow into the hollows will occur. If, however, the inside dimensions of the tubular portion of the sections are less than the design dimensions, the internal compressive forces will be greater. Before these forces are sufficient to distort the sidewalls of the section, the excess metal will cold flow into the hollows. As a result, the amount of metal of the angle which is displaced by the edges 29 of pin 17 is less than if a smooth walled pin were used and the expansion of the split arms is, therefore, less. The pressure applied to the walls 19 ans 20 by the two portions 27 and 28 of the angle is just sufficient to fill the tubular portion of the section without the slightest arching occurring.

The head of the pin is preferably tapered at an angle from about 40 to 50 degrees, most preferably at about 45 degrees. It has been found that this degree of taper insures that the connector is forced against the opposite side wall 13 before expansion and an aperture of about the full diameter of the pin 17 is punched into the sidewall of the section, insuring adequate expansion and cold welding of the end of the pin. The taper on the beveled grooves of pin 17 can be the same as that of the head. When the pins are driven into the sections and connectors as described herein, the connectors are pressed against three internal walls of the section, i.e., the two sidewalls and the wall opposite from the pin entry.

The method of assembly of the sections will be described with reference to FIGS. 6-9. The sections are assembled in clamping presses having guns which are adapted to fire or press the pins into the sections with a highly precise alignment thereto.

Figure 7:
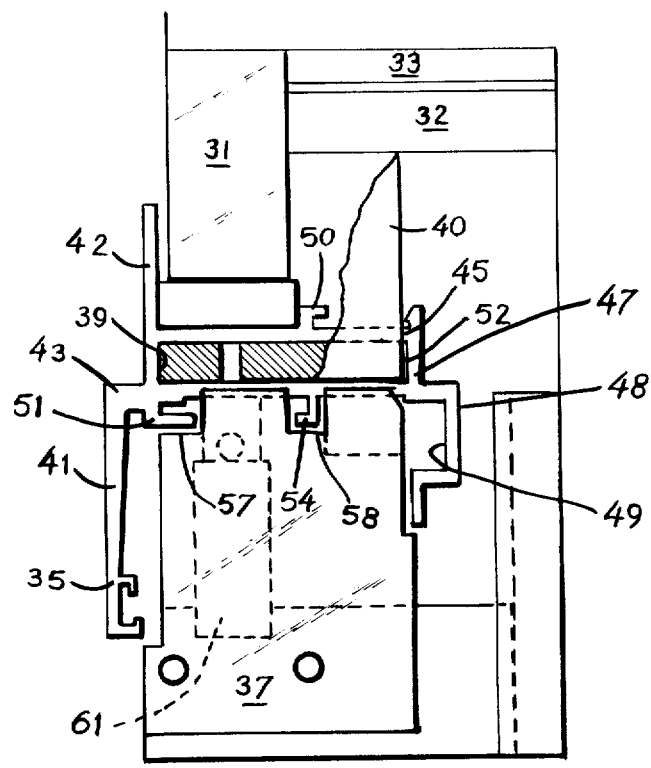
FIG. 7 is an end view of a portion of the assembly means shown in FIG. 6.
Figure 6:
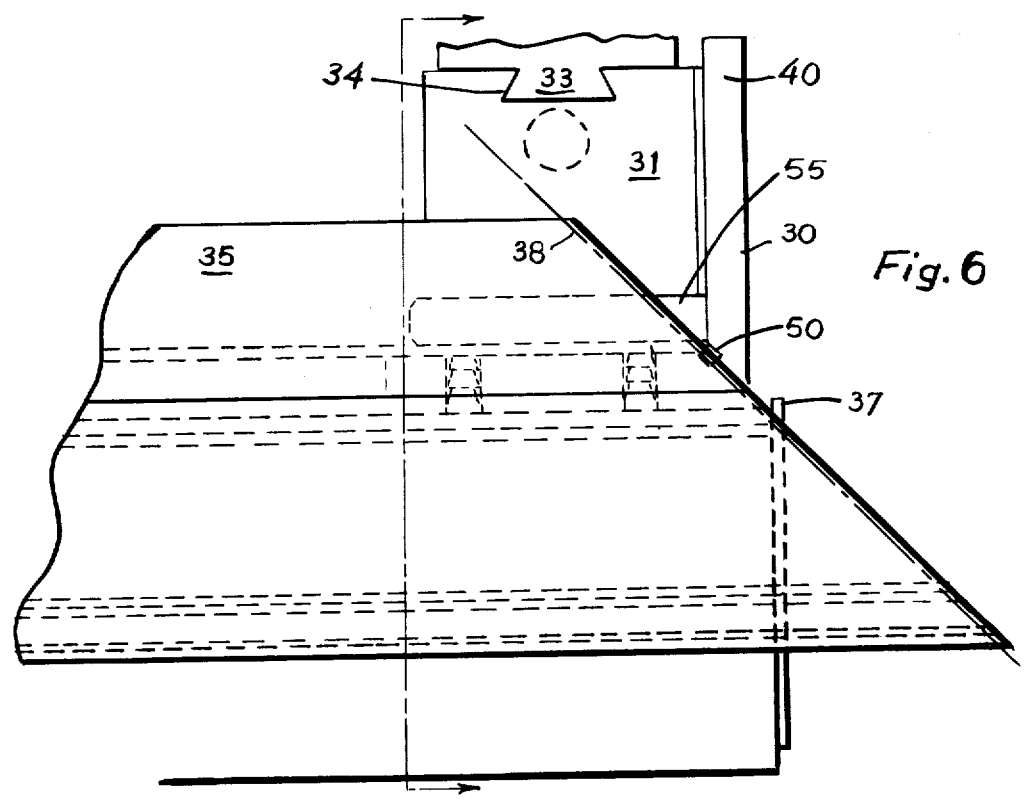
FIG. 6 is a side view of a section within as assembly means of the invention.

FIGS. 6 and 7 illustrate the press that is used to position one arm of a connector within a section. FIG. 6 is a partial view of the front of the clamping press which has a movable anvil 31 that is carried by reciprocable shaft 32. The anvil is slidably mounted on the head of the press by a track 33 which fits in a mating dovetailed groove 34 of the anvil. The section 35 rests on the bed 36 of the press and is aligned thereon by a stop plate 37 which is removably secured to the right end of the bed 36.

One arm 40 of connector 30 is inserted into the end of the tubular portion of section 35 and is advanced into its tubular portion until the inside face of its free (upright) arm 40 bears against the end face of anvil 31. In this position, the angle connector extends inwardly, slightly past its intended joint line which is shown by broken line 38. The angle is permitted to enter the tubular section by groove 50, which extends along the inside base of connector 30.

The shape of the press and stop plate will be more apparent from an inspection of FIG. 7 which is a view from the end of the press. A portion of the upstanding free arm 40 of connector 30 is removed to simplify the illustration. Section 35 is a fairly complex extrusion, having major flat faces 41 and 42 which are slightly offset by shoulder 43 and a tubular section which is defined by the inside wall 39 of face 42, parallel sidewalls 45 and 46 which extend transversely therefrom and inside wall 52 of opposite face 47. Sidewall 46 extends past sidewall 45 and has a dependent face 48 with another offset face to form an inwardly directed channel 49. The outside surfaces of sidewalls 45 and 46 also bear a plurality of upright ribs such as 50 on sidewall 45 and ribs 51 and 54 on sidewall 46.

The position of slit 70 in angle 30 is designed to fit the particular section within an area having an unobstructed face on each of its sidewalls to permit positioning of the anvil and pin firing mechanisms. For the illustrated section 35, slit 70 is placed near wall 39, but sufficiently removed therefrom that the faces 41 and 42 are not bowed outwardly by expansion of the split halves of arms 40.

A second anvil means 55 is positioned beneath the movable anvil 31 to fill the space between the anvil 31 and the section 35. This space is caused by the necessity for the lower face of anvil 31 to clear the upright rib 50. The anvil 55 can be a flat metal plate which can be hand positioned after the section has been placed on the press. The section is placed in the press with anvil 31 fully retracted, anvil 31 is extended over the upper surface of the section and then the hand anvil 55 is inserted in place as illustrated.

Section 35 is aligned laterally and longitudinally in the press by stop plate 37 which is secured to bed 36 by screws or other suitable means. The plate extends sligtly above the lower edge of sidewall 46 to serve as a longitudinal stop as shown in FIG. 6. The plate 37 also bears notches 57 and 58 which mate with ribs 51 and 54 to align the section laterally in the press as shown in FIG. 7.

Bed 36 supports pin firing or pressing mechanisms in the form of cylinders 60 and 61 which are aligned on centerlines beneath slit 70. These mechanisms are operative to press pins 17 through the sidewall of the section and into position in slit 70. Pressures that can be used are from about 7,000 to about 12,000 pounds on each pin. Since the pins have a diameter of about 0.15 to about 0.2 inch, the resultant, applied pressure is from about 225,000 to about 7,000 psi.

Figure 8:
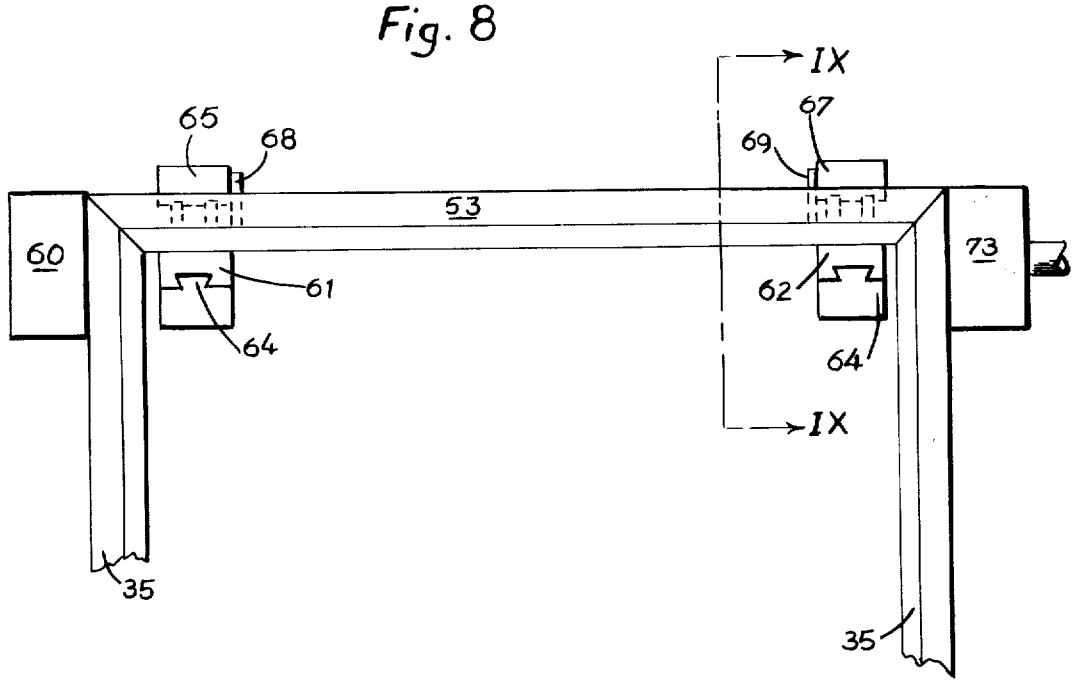
FIG. 8 is a view of the second assembly means used in the invention.

After an angle 30 has been secured with one of its arms 40 in each end of section 35, two of the sections are secured to the mating ends of section 53 to from a frame. FIG. 8 is a plan view of a clamping press which is used for this assembly. The frame is placed, horizontally, on the bed of the press. The opposite ends of section 53 are placed with their tubular sections over the free ends 40 of the connectors 30 and the assembly is placed on the horizontal press with one section 35 bearing against a fixed stop 60. The anvils 61 and 62 are carried on shafts such as 63; see FIG. 9; and are movable, vertically, on tracks such as 64.

The horizontal press has two sets of pin firing or pressing mechanisms 65 and 67 at each end. The mechanisms, which are in the form of cylinders, are supported by upright posts such as 59. these mechanisms also bear support plates 68 and 69 which provide vertical support for the section 53 to align it with sections 35 which also rest on vertical stops, not shown, of the press. Each support plate has notches such as 71 and 72 which are shown for plate 69 in FIG. 9 and which mate to the ribs 51 and 54.

Figure 9:
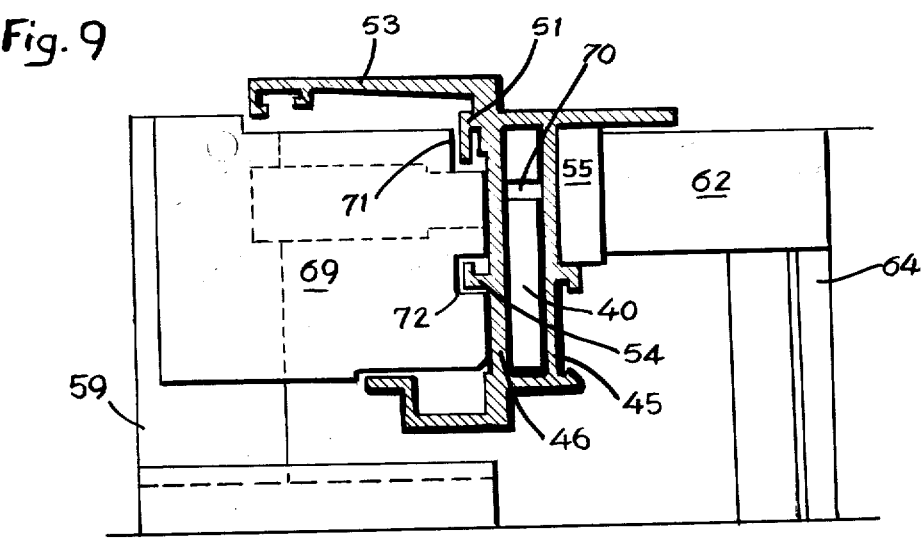
FIG. 9 is a view along line IX—IX of FIG. 8.

The section 53 is placed on plates 68 and 69, the anvils 61 and 62 are raised with supplemental anvils such as 55 being placed as shown in FIG. 9, when needed because of obstructions on the outside of sidewall 45. With the anvils in place, ram 73, shown in FIG. 8, is actuated by hydraulic, pneumatic or hand screw pressure to apply an axial pressure along section 53 and thereby compress the joints. The application of this pressure can be controlled by visual inspection of the joints so that perfectly mitered joints are formed by the application of sufficient pressure. Generally, a pressure from 200 to about 1000 pounds per square inch of cross sectional area of the metal sections can be used. Preferably a pressure from 400 to about 600 pounds per square inch of metal section is used for this purpose. The joining of in-line sections uses somewhat lesser pressures, e.g., from about 50 to about 200 pounds per square inch of metal section. The guns are then actuated to drive pins 17 through sidewall 46, slit 70 and into a cold weld by the malleable pellet to wall 45.

The support shafts for the movable anvils can be hydraulically or pneumatically actuated with a manually or automatically controlled mechansim. The guns can also be actuated with hydraulic or pneumatic pressure, as desired.

Figure 10:
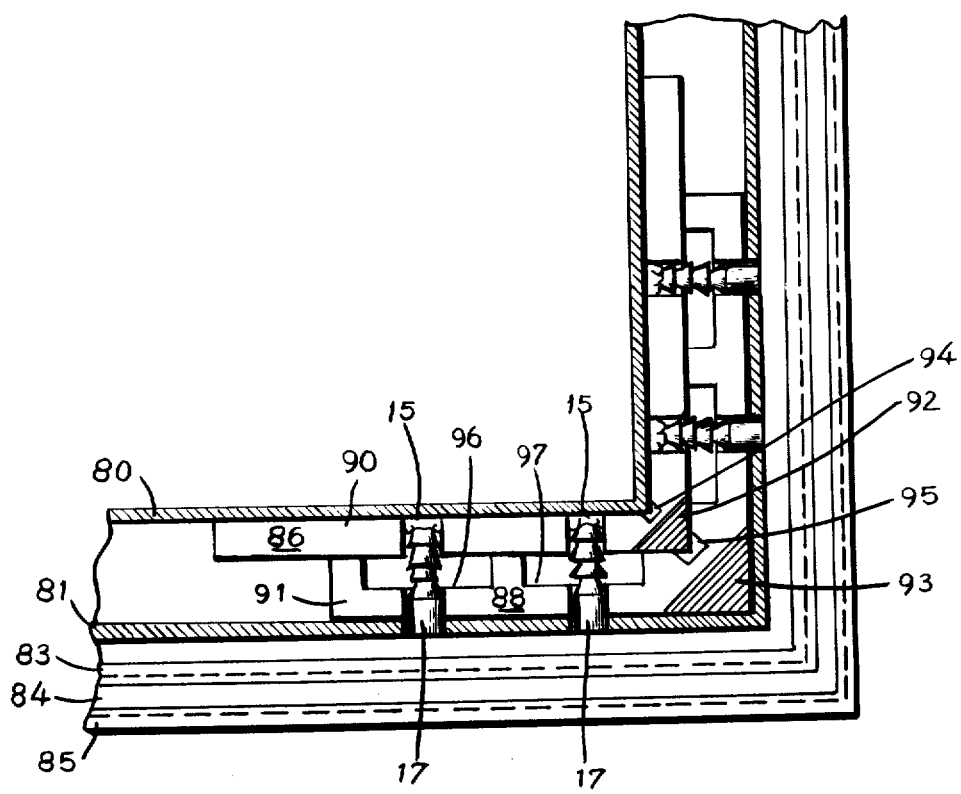
FIG. 10 is a view of a joint of sections having thick tubular elements.

FIG. 10 illustrates a joint of two sections having a relatively large tubular portion. The sections are formed of a rectangular tube defined by sidewalls 80 and 81 and edge walls such as 82. The latter bears an offset face 84 which has a channel on its inside surface defined by ribs 83 and 85. Because of the limit to the ductility of the metal and practical limits of pressure that can be employed, it is desirable that the maximum thickness of the arms of the connectors be no greater than about 0.225 to about 0.275 inch. When tubular sections of greater internal thicknesses are encountered, a plurality of connectors can be used as shown in FIG. 10.

The connectors are shown as 86 and 88 and, as with those previously described, they have their arms split with slits 90 and 91 which extend into the corner of each connector to leave a web 92 and 93. Each of the connectors also has a groove, 94 and 95, at its inside base to permit stacking of the connectors into the first section a sufficient distance so that subsequent compression of the mating sections will draw them into a precisely and tightly mitered joint.

The connector 88 also bears a plurality of grooves 96 and 97 on the inside surface of its arms. These grooves, as well as grooves 94 and 95, are formed during extrusion of the angle from which the connector is cut. Grooves 96 and 97 further relieve the depth through which the pins must be fired so that the overall thickness of the connector can be substantially greater than the aforestated 0.225 to 0.275 inch maximum thickness.

Pins are driven into the sections in the manner previously described and from a malleable metal pellet 15 which is driven into slit 90 of connector 86 where the pin is cold welded to the inside of sidewall 80 and the arms of connector 86.

Figure 11:
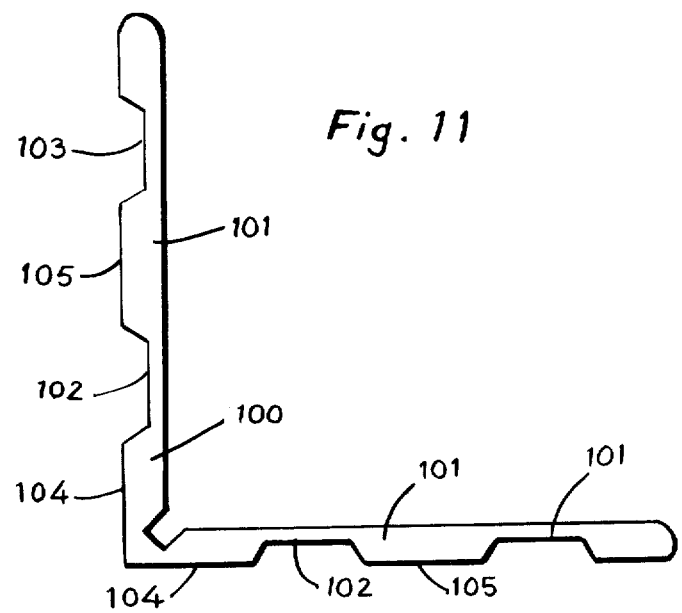
FIG. 11 is a view of another typical connector.

When connectors with grooves such as 96 and 97 are employed, it is preferred to have the grooves on the inside surface, opposite from the side of the pin entry. In some instances, however, it may be desirable to have the outer surfaces grooved to reduce the weight of the connector or for other reasons. Such a connector is shown in FIG. 11 as an angle 100 having arms 101 with grooves 102 and 103. When such connectors are used, the pins should be driven into the sidewall in the unrelieved areas of full thickness of the connector which are identified as areas 104 and 105.

Figure 12:
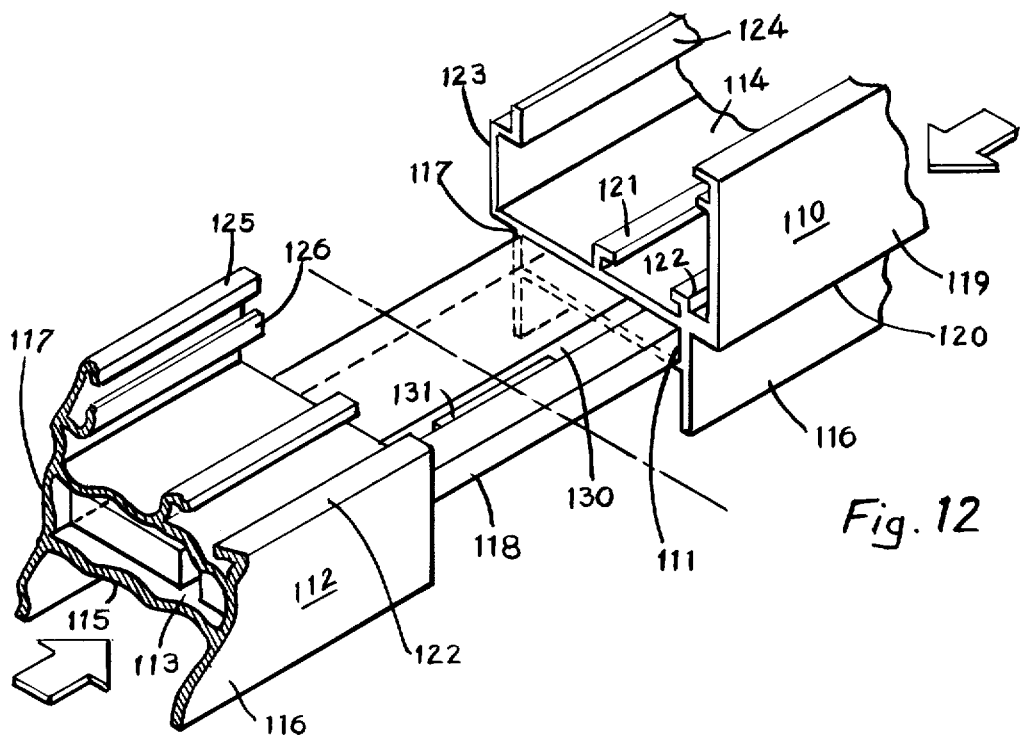

FIG. 12 illustrates the in-line joining of two sections having tubular portions. The sections can be identical in cross section or, as illustrated, can have dissimilar cross sections. The latter are commonly employed in the outer and vent frames of pivotable doors and windows. Section 110 is shown with a tubular portion 111 and section 112 is shown with a tubular portion 113. These tubular portions can be identical in size and shape and are shown as rectangular. The tubular portions are defined by parallel upper and lower walls 114 and 115 and sidewalls 116 and 117, with the sidewalls extending downwardly below wall 115. The connector, which is in the form of a flat bar 118, extends between the sections and in their tubular portions.

Section 110 has an upright face 119 which is offset from the tubular portion of the section by shoulder 120. Upper walls 114 of the tubular portions of the sections bear two parallel rims 121 and 122 which have opposed lips along their top edges to form a track on the upper surface of the wall 114. A wall, 123, extends along the edge of wall 114 opposite from wall 119. This wall is offset outwardly from the section and bears an inset rim 124.

Wall 117 of section 112 extends upwardly, above wall 114, and bears two parallel inset rims 125 and 126 which have opposed lips to form a track.

The connector is a flat bar approximately 0.225 to about 0.275 inch thick and has a kerf 130 cut along its length. At the mid-portion of the bar, the kerf extends a depth of about one-third the thickness of the bar from each face of the bar to provide a thin web section 131. Outwardly from this web, the kerf is cut through the entire thickness of the bar, as apparent from the end view of the bar in section 112. The pins are driven into the sections in alignment with kerf 130 to pass through the kerf on either side of the web section 131.

Figure 13:
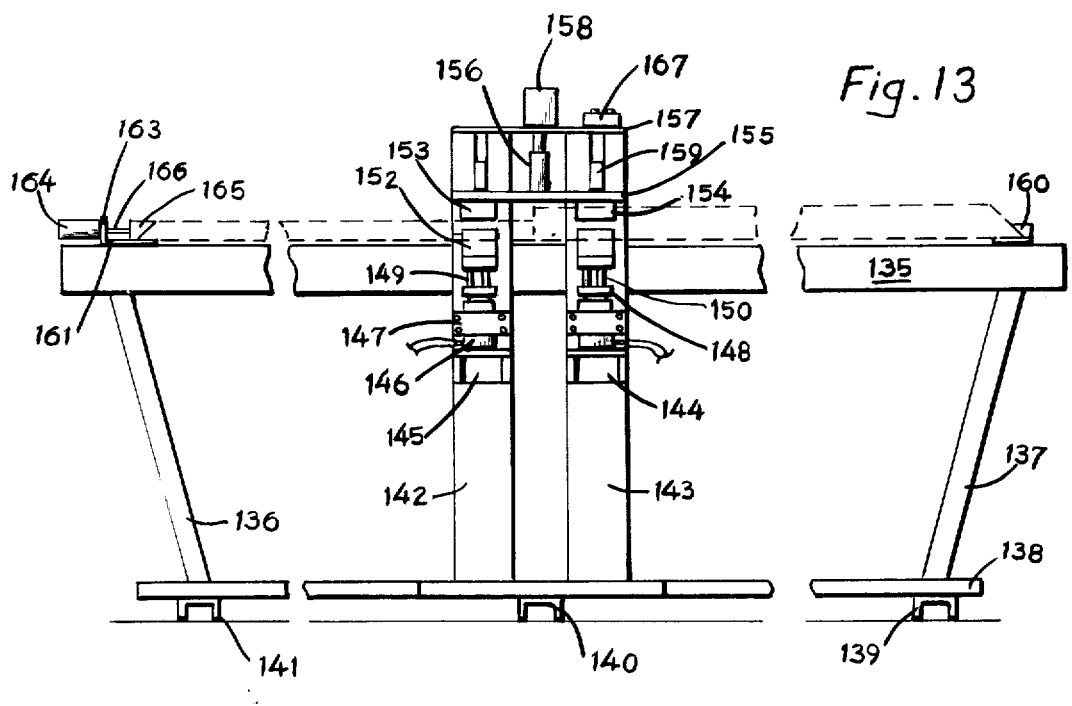

The in-line joining is performed on a press such as that shown in FIG. 13. This press forces pins into the sections in the manner previously described. The press has a horizontal rail 135 which is supported at its opposite ends by legs 136 and 137 which project upwardly from a bottom rail 138. The bottom rail is carried on several inverted channels 139, 140 and 141 which impart fore and aft stability to the press.

The anvil and pin firing assemblies are supported at the center of the press on two upright standards 142 and 143. Each standard bears a shelf, 144 and 145, on which rest cylinders 146. These cylinders are also clamped to the standards by split blocks 147 which are bored to clamp about the cylinders. The blocks are secured to the standards by bolts or similar fasteners. Each cylinder is fitted with a reciprocating piston and conduits to supply a pressured hydraulic fluid to the undersurface of the piston.

Each piston is connected to a ram plate 148 which bears, at opposite ends, push rods 149 and 150 with a center guide, not shown. These rods extend through vertical bores in blocks 152. The pins are placed in the bores of blocks 152 above push rods 149 and 150.

The anvil assemblies are carried at the upper ends of standards 142 and 143. Each anvil assembly comprises movable anvil plate 155 which is supported on shaft 156. At the top of the standards is a horizontal plate 157 which supports cylinder 158 above shaft 156. A reciprocatable piston in cylinder 158 is attached to shaft 156 to effect movement of plate 155. Brackets 159 are employed to either side of shaft 156 to give lateral stability to plate 155. Anvils 153 and 154 are blocks that are shaped to fit the particular sections being joined and can be manually placed on the sections as anvil plate 155 is lowered into place.

Connector 118 is placed in the sections and the loose assembly of the sections and connector is placed on the press with the underside of wall 115 resting on the upper edge of blocks 152 as shown by the broken lines of FIG. 13. mitered ends of the sections are placed in clamps 160 and 161 which are carried on the upper edge of rail 135. The rail 135 has a track along its rear surface (not shown) and clamps 160 and 161 can be adjustably secured along this track to accomodate section assemblies of different lengths. At least one of the clamps has compression means to apply an axial force along the section assembly. This is shown on clamp 161 which comprises a sliding bracket 162 with an upright leg 163 that supports hydraulic cylinder 164. Block 165 is carried on shaft 166 that extends from the piston in cylinder 164.

After the sections have been compressed into a precise alignment with a hairline juncture, the anvil plate 155 is lowered while manually placing anvils 153 and 154 over the sections. The pins can then be driven into the sections by the supply of a pressured hydraulic fluid to the cylinders 146.

The various hydraulic cylinders can be actuated by a pressured supply of hydraulic fluid. The fluid supply can be controlled by valves which are actuated from a console unit 167 which rests on plate 157.

The invention has been described with reference to presently preferred and illustrated embodiments. It is not intended by this specific illustration and description that the invention be limited to such preferred embodiments. Instead, it is intended that the invention be defined by the means and steps, and their obvious equalivalents, set forth in the following claims.

I claim:

1. In a method for forming a miter joint between mating ends of sections having at least one tubular element wherein a right angle connector of a width and thickness slightly less than the internal dimensions of the tubular elements and with opposite arms bearing longitudinal slits extending substantially along said arms with a small web therebetween is positioned within the tubular elements of said sections to bridge the juncture of the joined sections and the slit halves of each arm are wedged outwardly into expansion with three of the internal walls of the tubular elements by pins driven transversely through the walls of the sections and into said slits, the improvement for securing a precise alignment between the joined sections which comprises: positioning one of the arms of the connector in the tubular element of a first section at a position therein past its intended joint line, securing said connector in the tubular element of the first section by driving at least one metal pin through a wall of the first section and the slit halves of said arm to expand said slit halves of said arm into a three-walled contact with the internal walls of said tubular element and thereafter positioning the second section on the remaining arm of said connector, applying a force, axially, to said second section to compress said sections and draw said connector into precise alignment on the juncture plane of said joined sections and thereupon driving at least one metal pin through the wall the the second section to enter the slit of the connector's remaining arm and expand its halves outwardly into binding engagement with the internal walls of the second section 2. The method of claim 1 wherein said connector is inserted into the tubular element of said first section a distance from 0.005 to about 0.02 inch past its intended joint line.

3. The method of claim 1 wherein said connector is inserted into the tubular element of said first section a distance from 0.01 to about 0.015 inch past its intended joint line.

4. The method of claim 1 wherein said force applied to said sections is from 200 to about 1000 pounds per square inch of cross sectional area of said metal sections.

* * * * *

UNITED STATES PATENT OFFICE
CERTIFICATE OF CORRECTION

Patent No. 3,898,728         Dated August 12, 1975

Inventor(s) Paul E. Rousseau

It is certified that error appears in the above-identified patent and that said Letters Patent are hereby corrected as shown below:

In the Specification, Column 2, line 41, after "secured with" insert --pins--; line 66, after the word FIGS. change "11 and 12" to --12 and 13--; Column 3, line 14, after the words "On the" insert --inner--; Column 4, line 1, change "amd" to --and--; line 25, after the word "pin" insert --17--; Column 6, line 49, change "mechansim" to --mechanism--; Column 7, line 16, after the word "Pins" insert --17--; Column 8, line 40, after "FIG. 13" insert --The--.

Signed and Sealed this fourth Day of November 1975

[SEAL]

Attest:

RUTH C. MASON
Attesting Officer

C. MARSHALL DANN
Commissioner of Patents and Trademarks